(12) United States Patent
Georgiev et al.

(10) Patent No.: US 8,266,514 B2
(45) Date of Patent: Sep. 11, 2012

(54) MAP SERVICE

(75) Inventors: Dimiter Georgiev, Bellevue, WA (US); Shenghua Ye, Sammamish, WA (US); Gerardo Vilarreal Guzman, Woodinville, WA (US); Kieran Snyder, Seattle, WA (US); Ryan M. Cavalcante, Seattle, WA (US); Tarek M. Sayed, Sammamish, WA (US); Yaniv Feinberg, Redmond, WA (US); Yung-Shin Lin, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1096 days.

(21) Appl. No.: 12/147,443

(22) Filed: Jun. 26, 2008

(65) Prior Publication Data
US 2009/0327860 A1   Dec. 31, 2009

(51) Int. Cl.
*G06F 17/00* (2006.01)
(52) U.S. Cl. .................................................. 715/205
(58) Field of Classification Search .................. 715/200, 715/205
See application file for complete search history.

(56) References Cited

U.S. PATENT DOCUMENTS

| | | | |
|---|---|---|---|
| 5,548,507 A | 8/1996 | Martino | |
| 5,579,466 A * | 11/1996 | Habib et al. | ............... 715/210 |
| 5,966,637 A | 10/1999 | Kanungo | |
| 6,002,998 A | 12/1999 | Martino | |
| 6,047,251 A | 4/2000 | Pon et al. | |
| 6,157,905 A | 12/2000 | Powell | |
| 6,167,369 A | 12/2000 | Schulze | |
| 6,321,372 B1 | 11/2001 | Poirier | |
| 6,338,033 B1 | 1/2002 | Bourbonnais | |
| 6,363,433 B1 | 3/2002 | Nakajima | |
| 6,366,906 B1 | 4/2002 | Hoffman | |
| 6,553,385 B2 | 4/2003 | Johnson | |
| 6,560,596 B1 | 5/2003 | Margulies | |
| 6,654,741 B1 | 11/2003 | Cohen | |
| 6,701,364 B1 | 3/2004 | Meyer | |
| 6,718,519 B1 | 4/2004 | Taieb | |
| 6,951,008 B2 | 9/2005 | Quaile | |
| 7,035,801 B2 | 4/2006 | Jimenez-Feltstrom | |
| 7,177,799 B2 | 2/2007 | Calcagno | |
| 7,191,116 B2 | 3/2007 | Alpha | |
| 7,228,501 B2 | 6/2007 | Brown et al. | |
| 7,260,574 B2 | 8/2007 | McConnell | |
| 7,295,966 B2 | 11/2007 | Barklund | |
| 7,315,810 B2 | 1/2008 | Azzam | |
| 7,346,511 B2 | 3/2008 | Privault et al. | |

(Continued)

FOREIGN PATENT DOCUMENTS
WO   WO-2007051246   5/2007

OTHER PUBLICATIONS

Lieberman et al. Adaptive Linking between Text and Photos Using Common Sense Reasoning, Google 2006, pp. 2-11.*

(Continued)

*Primary Examiner* — Cong-Lac Huynh
(74) *Attorney, Agent, or Firm* — Wolfe-SBMC

(57) ABSTRACT

Map service techniques are described. In an implementation, one or more computer-readable media comprise instructions that are executable by a computer to recognize from text an action that is performable by a particular one of a plurality of webpages and parse a set of parameters from the text to be passed to the particular said webpage to cause the webpage to perform the action.

17 Claims, 8 Drawing Sheets

U.S. PATENT DOCUMENTS

| | | | | |
|---|---|---|---|---|
| 7,552,045 | B2 | 6/2009 | Barliga et al. | |
| 7,593,980 | B2* | 9/2009 | Marascio et al. | 709/201 |
| 7,818,165 | B2 | 10/2010 | Carlgren et al. | |
| 8,019,596 | B2 | 9/2011 | Georgiev | |
| 8,028,226 | B2* | 9/2011 | Boguraev et al. | 715/200 |
| 8,064,700 | B2* | 11/2011 | King et al. | 382/181 |
| 8,073,680 | B2 | 12/2011 | Georgiev | |
| 8,073,847 | B2* | 12/2011 | Kim et al. | 707/732 |
| 8,107,671 | B2 | 1/2012 | Georgiev et al. | |
| 8,180,626 | B2 | 5/2012 | Georgiev | |
| 2002/0143750 | A1 | 10/2002 | Brunssen et al. | 707/3 |
| 2003/0084113 | A1* | 5/2003 | Torii | 709/208 |
| 2004/0078191 | A1 | 4/2004 | Tian | |
| 2004/0078204 | A1 | 4/2004 | Segond | |
| 2004/0088438 | A1 | 5/2004 | Madril | |
| 2004/0107239 | A1* | 6/2004 | Hasegawa et al. | 709/200 |
| 2005/0091035 | A1 | 4/2005 | Kaplan | |
| 2005/0108195 | A1* | 5/2005 | Yalovsky et al. | 707/1 |
| 2005/0120303 | A1* | 6/2005 | Behbehani | 715/540 |
| 2005/0267935 | A1* | 12/2005 | Gandhi et al. | 709/203 |
| 2006/0026518 | A1 | 2/2006 | Jung | |
| 2006/0047690 | A1 | 3/2006 | Humphreys | |
| 2006/0064583 | A1* | 3/2006 | Birnbaum et al. | 713/164 |
| 2006/0074630 | A1 | 4/2006 | Chelba | |
| 2006/0074980 | A1* | 4/2006 | Sarkar | 707/104.1 |
| 2006/0184357 | A1 | 8/2006 | Ramsey | |
| 2006/0229865 | A1 | 10/2006 | Carlgren | |
| 2007/0130208 | A1* | 6/2007 | Bornhoevd et al. | 707/104.1 |
| 2007/0242071 | A1 | 10/2007 | Harding | |
| 2007/0260520 | A1 | 11/2007 | Jha | |
| 2008/0034377 | A1* | 2/2008 | Vo et al. | 719/320 |
| 2008/0039078 | A1* | 2/2008 | Xu et al. | 455/432.1 |
| 2008/0086700 | A1* | 4/2008 | Rodriguez et al. | 715/804 |
| 2008/0104039 | A1* | 5/2008 | Lowson | 707/3 |
| 2009/0076820 | A1* | 3/2009 | Paik | 704/260 |
| 2009/0150910 | A1* | 6/2009 | Lyndersay et al. | 719/328 |
| 2009/0217239 | A1* | 8/2009 | Ford | 717/113 |
| 2009/0248741 | A1* | 10/2009 | Singh et al. | 707/104.1 |
| 2009/0324005 | A1 | 12/2009 | Georgiev | |
| 2009/0326918 | A1 | 12/2009 | Georgiev | |
| 2009/0326920 | A1 | 12/2009 | Georgiev | |
| 2010/0019030 | A1* | 1/2010 | Monk | 235/380 |
| 2010/0070282 | A1* | 3/2010 | Cho et al. | 704/260 |
| 2010/0241712 | A1* | 9/2010 | Nitzsche et al. | 709/206 |
| 2012/0029906 | A1 | 2/2012 | Georgiev | |
| 2012/0036141 | A1* | 2/2012 | Kim et al. | 707/756 |
| 2012/0059646 | A1 | 3/2012 | Georgiev | |
| 2012/0072968 | A1* | 3/2012 | Wysopal et al. | 726/1 |

OTHER PUBLICATIONS

Carvalho et al., On the Collective Classification of Email "Speech Acts", ACM 2005, pp. 345-352.*

Croke et al., Using Name Entities as a Basis to Share Associative Trails between Semantic Desktops, Google 2005, pp. 1-11.*

Bakker et al., Next Generation Service Creation Using XML Scripting Languages, IEEE 2002, pp. 2001-2007.*

Sayar et al., Integrating AJAX Approach into GIS Visualization Web Services, IEEE 2006, p. 1-7.*

"Non-Final Office Action", U.S. Appl. No. 12/147,340, (Jan. 20, 2011),11 pages.

"Non-Final Office Action", U.S. Appl. No. 12/147,340, (Apr. 29, 2011),7 pages.

"Non-Final Office Action", U.S. Appl. No. 12/147,389, (Jan. 19, 2011),10 pages.

"Notice of Allowance", U.S. Appl. No. 12/147,389, (Apr. 29, 2011),12 pages.

"Non-Final Office Action", U.S. Appl. No. 12/147,284, (Jul. 20, 2011), 11 pages.

"Notice of Allowance", U.S. Appl. No. 12/147,284, (Sep. 22, 2011), 6 pages.

"Notice of Allowance", U.S. Appl. No. 12/147,340, (Aug. 23, 2011), 6 pages.

Atserias, J. "FreeLing 1.3: Syntactic and Semantic Services in an Open-Source NLP Library", Retrieved from http://www.lsi.upc.edu/~nlp/papers/2006/lrec06-accgpp.pdf., 6 Pages.

Englmeier, Kurt "Adapting the Communication Capacity of Web Services to the Language of their User Community", Retrieved from http://www.irit.fr/recherches/IRI/SIG/personnes/mothe/pub/ICWS04.pdf, 9 Pages.

Kikui, Gen-Itiro "Identifying the Coding System and Language of On-line Documents on the Internet", Retrieved from http://citeseer.ist.psu.edu/cache/papers/cs/22951/http:zSzzSzwww.slt.atr.co.jpzS.z~gkikuizSzpaperszSz9608KikuiCOLING.pdf/kikui96identifying.pdf., 6 Pages.

Suzuki, Izumi et al., "A Language and Character Set Determination Method Based on N-gram Statistics", Retrieved from http://delivery.acm.org/10.1145/780000/772759/p269-suzuki.pdf?key1=772759&kev2=4420745021&coll=GUIDE&dl=GUIDE&CFID=59253019& CFTOKEN=83418411., 10 Pages.

"Unicode Technical Standard", Retrieved from http://unicode.org/reports/tr39/#Mixed_Script_Detection on Mar. 14, 2008., 14 Pages.

"XeLDA White Paper", Retrieved from http://www.temis.com/fichiers/t_downloads/file_55_Xelda_WP.pdf., 33 Pages.

Li, Shanjian at al., "A composite approach to language/encoding detection", Retrieved from http://www.mozilla.org/projects/intl/UniversalCharsetDetection.html on Mar. 14, 2008., 17 Pages.

"LanguageIdentifier.com", Retrieved from http://www.lextek.com/langid/li/ on Mar. 14, 2008., 2 Pages.

"Google Notebook Browser Extension", Retrieved from http://pinkflamingoresources.blogspot.com/2007/10/google-notebook-browser-extension.html on Mar. 14, 2008., 3 Pages.

"NDS Browser", Retrieved from http://www.novell.com/hungary/internet/ONLINE/ADMIN/NDS.HTM on Mar. 14, 2008., 7 Pages.

Dzbor, Martin et al., "Magpie—Towards a Semantic Web Browser", Retrieved from http://kmi.open.ac.uk/people/domingue/papers/magpie-iswc-03.pdf., 16 Pages.

"Name-to-Thing (N2T) Resolver", Retrieved from http://n2t.info/ on Mar. 14, 2008., 6 Pages.

"Non-Final Office Action", U.S. Appl. No. 13/272,077, (Dec. 1, 2011), 5 pages.

"Supplemental Notice of Allowance", U.S. Appl. No. 12/147,284, (Nov. 30, 2011), 3 pages.

"Notice of Allowance", U.S. Appl. No. 13/272,077, (Feb. 3, 2012), 6 pages.

"Supplemental Notice of Allowance", U.S. Appl. No. 12/147,284, (Jan. 5, 2012), 2 pages.

* cited by examiner

MAP SERVICE

BACKGROUND

A uniform resource locator (URL) includes an address that points to a webpage that may perform an action. For example, the URL "http://www.msn.com/" may direct a web browser to a webpage on the MSN website (Microsoft Corporation, Redmond, Wash.). When the URL is selected, such as by clicking on a text representation of the URL, the web browser may be invoked and the browser may use the Internet to go to the webpage indicated by the URL. However, URLs point to a single webpage and if the URL is incorrect or changes, the web browser will not be able to open the webpage.

In addition, developing code to link the URL and provide the webpage may be time consuming and tedious as numerous instructions are included in one or more files that tell the webpage how to perform an action. For example, a webpage may include a file in which text from an article is incorporated with extensible markup language (XML) tags that tells the web browser how to present the text. As a result, developing applications and webpages linked by URLs is may be inefficient.

SUMMARY

Map service techniques are described. In an implementation, one or more computer-readable media comprise instructions that are executable by a computer to recognize from text an action that is performable by a particular one of a plurality of webpages and to parse a set of parameters from the text to be passed to the particular said webpage to cause the webpage to perform the action.

In an implementation, a recognition is made from text received from an application of an action that is performable by a webpage. A set of parameters for the action is parsed from the text and the set of parameters is customized in accordance with one or more criteria specified by the application.

In an implementation, a system comprises a map service to recognize an action from a text that is performable by a webpage and pass a set of parameters parsed from the text to cause the webpage to perform the action.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The terms "service" and/or "module," for instance, may refer to system(s), computer-readable instructions (e.g., one or more computer-readable storage media having executable instructions) and/or procedure(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
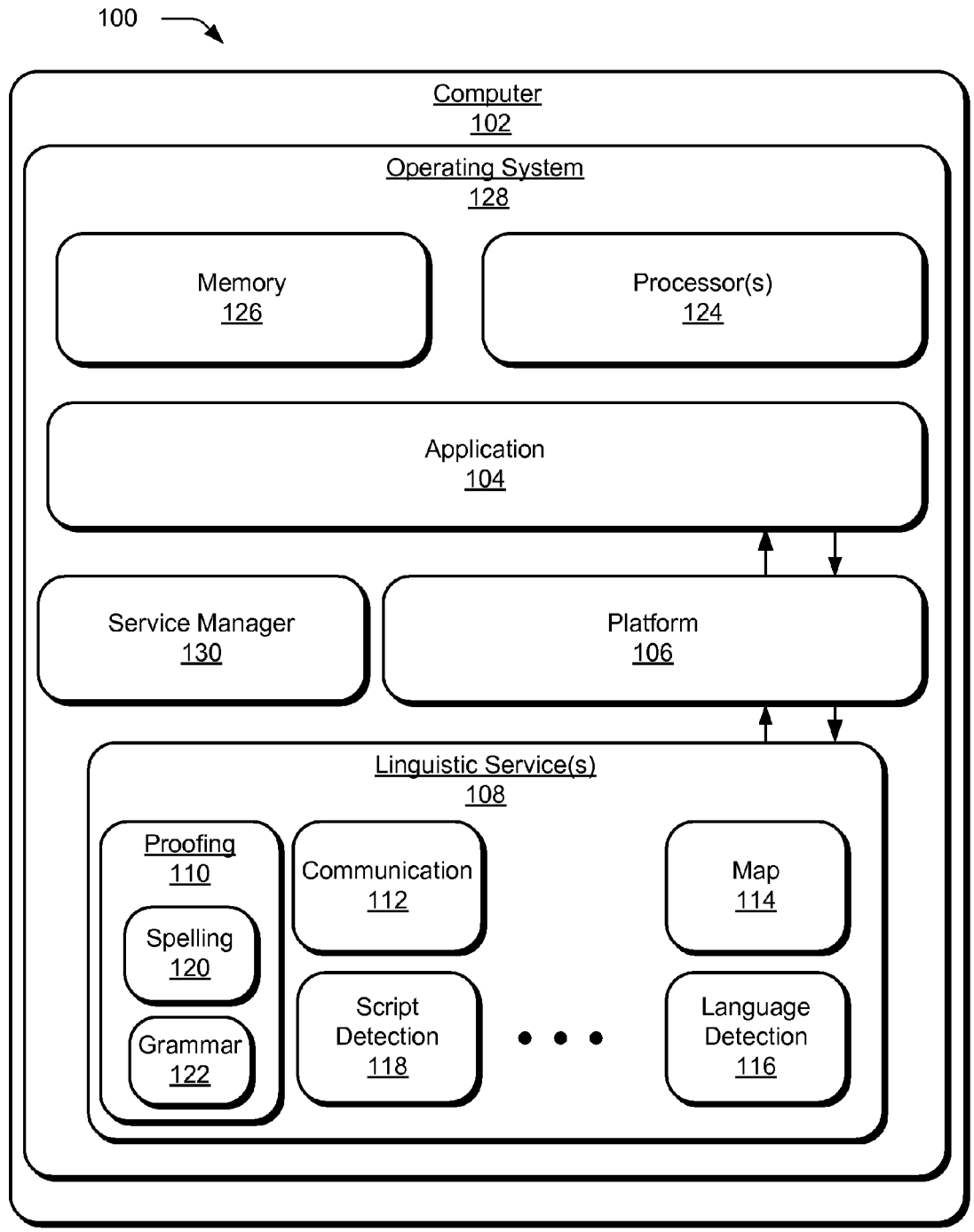
FIG. 1 is an illustration of an environment in an example implementation that is operable to employ brokered communication techniques.

Traditionally, a uniform resource locator (URL) is used to point to a webpage that may provide additional information or perform a task. For example, a URL may be included in a word processing document to open a webpage that corresponds to the URL. Since the URL corresponds to a particular webpage, when the address of the webpage changes or the address is incorrect, a web browser used to open the webpage will be unable to do so.

In addition, developing webpages and incorporating URLs to link applications with webpages may be tedious and inefficient. For example, developing a webpage and the corresponding URL to perform a task for an application may involve accounting for numerous files and ensuring that the application and webpage interact in a seamless manner.

Map service techniques are described. In an implementation, one or more computer-readable media comprise instructions that are executable by a computer to recognize from text an action that is performable by a particular one of a plurality of webpages and to parse a set of parameters from the text to be passed to the particular said webpage to cause the webpage to perform the action. Consequently, an application providing the text and the webpage may operate in a data driven manner to minimize the complexity associated with the webpage performing the action for the application.

In an implementation, a recognition is made from text received from an application, of an action that is performable by a webpage. A set of parameters for the action is parsed from the text and the set of parameters is customized in accordance with one or more criteria specified by the application.

In an implementation, a system comprises a map service to recognize an action from a text that is performable by a webpage and pass a set of parameters parsed from the text to cause the webpage to perform the action. For example, the map service may recognize that an electronic message may be sent to an email address from text characters included in the email address.

In the following discussion, an "Example Environment" is first described (FIGS. 1-3) that may employ map service techniques. The "Example Environment" is discussed with respect to interacting with an application through a platform. While example techniques, systems and approaches are generally described in FIGS. 1-3, in other implementations, the map services may be implemented in other environments and configurations. Discussions related to other linguistic services are included to highlight interactions between a map service, the platform, one or more applications, other linguistic services and so on. "Example Procedures" are also described that may be employed in the example environments, as well as in other environments. Although these, systems and techniques are described as employed in a computing environment in the following discussion, it should be readily apparent that these structures, modules, techniques and approaches may be incorporated in a variety of environments without departing from the spirit and scope thereof. In addition, while text and text data are discussed the methods, techniques, approaches, service, modules and so on may be configured to implement other encoded information. For example, a service may be configured to recognize property information for a video file.

Example Environment

FIG. 1 is an illustration of an environment 100 in accordance with one or more embodiments. The environment 100 includes a computer 102 having one or more applications 104 (one is illustrated) and one or more linguistic services 108 communicating with the application 104 through a platform 106. The linguistic services 108 are representative of functionality to recognize linguistic property information associated with text data in a text. The linguistic services 108 may be available to perform one or more functions for the application 104. For example, as illustrated, the linguistic services 108 may include a proofing service 110, a communication service 112, a mapping service 114, a language detection service 116, a script detection service 118 and so on. In one or more embodiments, the linguistic services 108 may be plugins to the platform 106. For example, the platform 106 may host the linguistic services 108.

The linguistic services 108 may include modules (e.g., subservices) to perform specific functions for a linguistic service. For example, the proofing service 110 may include a spelling module 120 and a grammar module 122 and so on.

While the computer 102 is illustrated as including a processor 124 and memory 126, the processor 124 and/or the memory 126 may be representative of one or more devices, e.g., the processor 124 may be representative of a plurality of central processing units. Processor(s) are not limited by the materials from which they are formed or the processing mechanisms employed therein. For example, processor(s) may be comprised of semiconductor(s) and/or transistors (e.g., electronic integrated circuits (ICs)) that execute instructions to provide the application 104 and/or linguistic services 108. Sample processor mechanisms may include, but are not limited to, quantum computing, optical computing, mechanical computing (e.g., using nanotechnology) and so on.

Although one memory is illustrated, a wide variety of types and combinations of memory may be employed, such as random access memory (RAM), read only memory (ROM), hard disk memory, removable medium memory and other types of computer-readable media. The memory 126, for example, may be used to store instructions used by the processor(s) to provide the application 104 and/or linguistic services 108.

The computer 102 is illustrated as executing an operating system 128 on the processor(s), which is also storable in the memory 126. The operating system 128 may be representative of functionality to "abstract" underlying functionality of the computer 102. The operating system 128 may, for example, provide a foundation for the application 104 and/or linguistic services 108 to be executed on the computer 102 without having to "know" the specific configuration of the computer 102, e.g., which particular "kind" processor is employed by the computer 102, amounts of memory and so on.

The platform 106 may broker communication between the application 104 and the linguistic services 108. For example, the platform 106 may be configured to broker communications passing through the platform 106 such that the linguistic services 108 are obscured from the application 104. By obscuring the linguistic services 108 from the application 104, the linguistic services 108 may be changed or added without encoding the change or the addition into the application's code. In this manner, the linguistic services 108 may be independent from the application 104. For example, instead of configuring a first linguistic service to function for a specific application, the first linguistic service may be formed so that multiple applications may implement the first linguistic service, e.g., individual instances of the first linguistic service. Additional aspects of the platform 106 and associated benefits are discussed with respect to sample communication sessions between the application 104 and the linguistic services 108.

In one or more embodiments, a service manager 130 may be included in the computer 102. The service manager 130 may be representative of functionality to expose a way for users to manage the platform 106 and/or the linguistic services 108. For example, when a user installs a new linguistic service, the service manager 130 may be used to manage a plugin process to override a previously installed service. Thus, for example, when a new proofing service is installed, the service manager 130 may be used to manage the platform 106 and/or the linguistic services 108 so that text data for proofing is communicated to the new proofing service rather than a previous proofing service.

Figure 2:
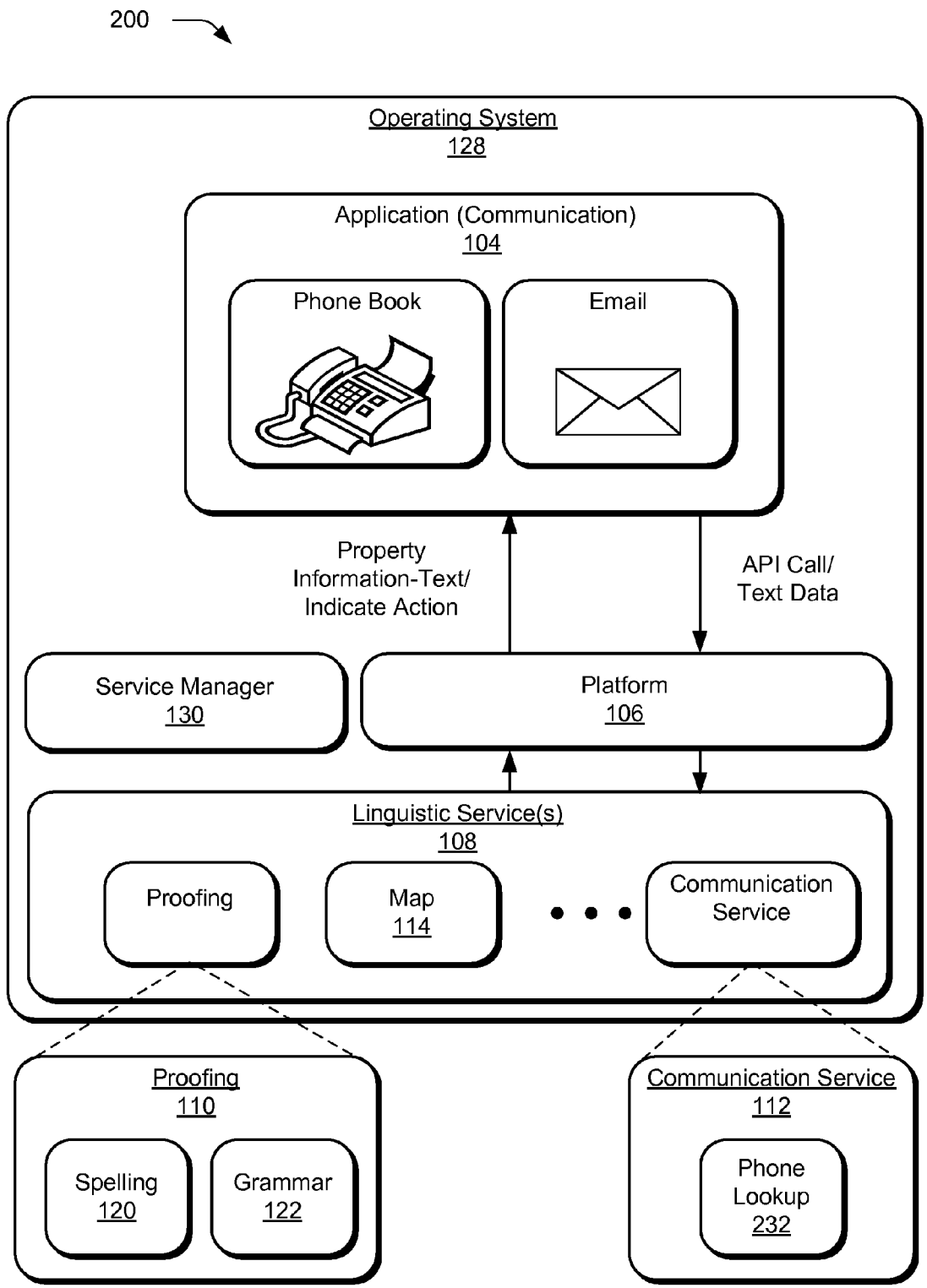
FIG. 2 is an illustration of a system in an example implementation in which a linguistic service is designated as available to an application through a platform.

Referring to FIG. 2, when initiating communication, the platform 106 may designate which linguistic services 108 (in system 200) are available for use by the application 104 (e.g., a communication application) based on a property of the linguistic service, e.g., a service property. For example, during an enumeration phase, the platform 106 may designate that the spelling property and a phone lookup property are available through the platform 106, rather than designating that the proofing service 110 and the communication service 112 are available for use by the application 104. By designating linguistic services 108 based on service properties, the platform 106 may obscure (e.g., conceal) the linguistic service providing the function to the application 104 (and vice versa). As a result, the application 104 may not be configured for a particular service in order to implement the functionality provided by the particular linguistic service. Although "a service property" is discussed, in one or more instances multiple service properties may be implemented.

For example, in response to receiving an application program interface (API) call, the platform 106 may designate the linguistic services available for use by the application 104. The platform 106 may designate that a particular linguistic service is available based on a service property of the particular linguistic service. In this way, the application 104 may not be tied to the particular linguistic service (e.g., the linguistic services 108 may be decoupled from the application 104) and the platform 106 may designate the available linguistic services without the application 104 issuing an API call specifying the particular linguistic service, e.g., an API call for the communication service 112. Moreover, the application 104 may use a limited number of API calls in comparison to issuing API calls tied to linguistic services.

In one or more embodiments, the application 104 may specify that linguistic services 108 are to be designated based on a service property specified in the API call. The application 104 may prescreen (e.g., filter) which linguistic services 108 are to be designated by specifying which service properties are relevant to the application 104. For example, a word processing application may specify that a spelling functionality is to be designated by issuing an API call specifying a spelling property. Accordingly, the platform 106 may not designate the communication service 112 because a phone lookup property was not specified in the API call. Having described designating linguistic services, communication and recognizing linguistic property information are now discussed.

Figure 3:
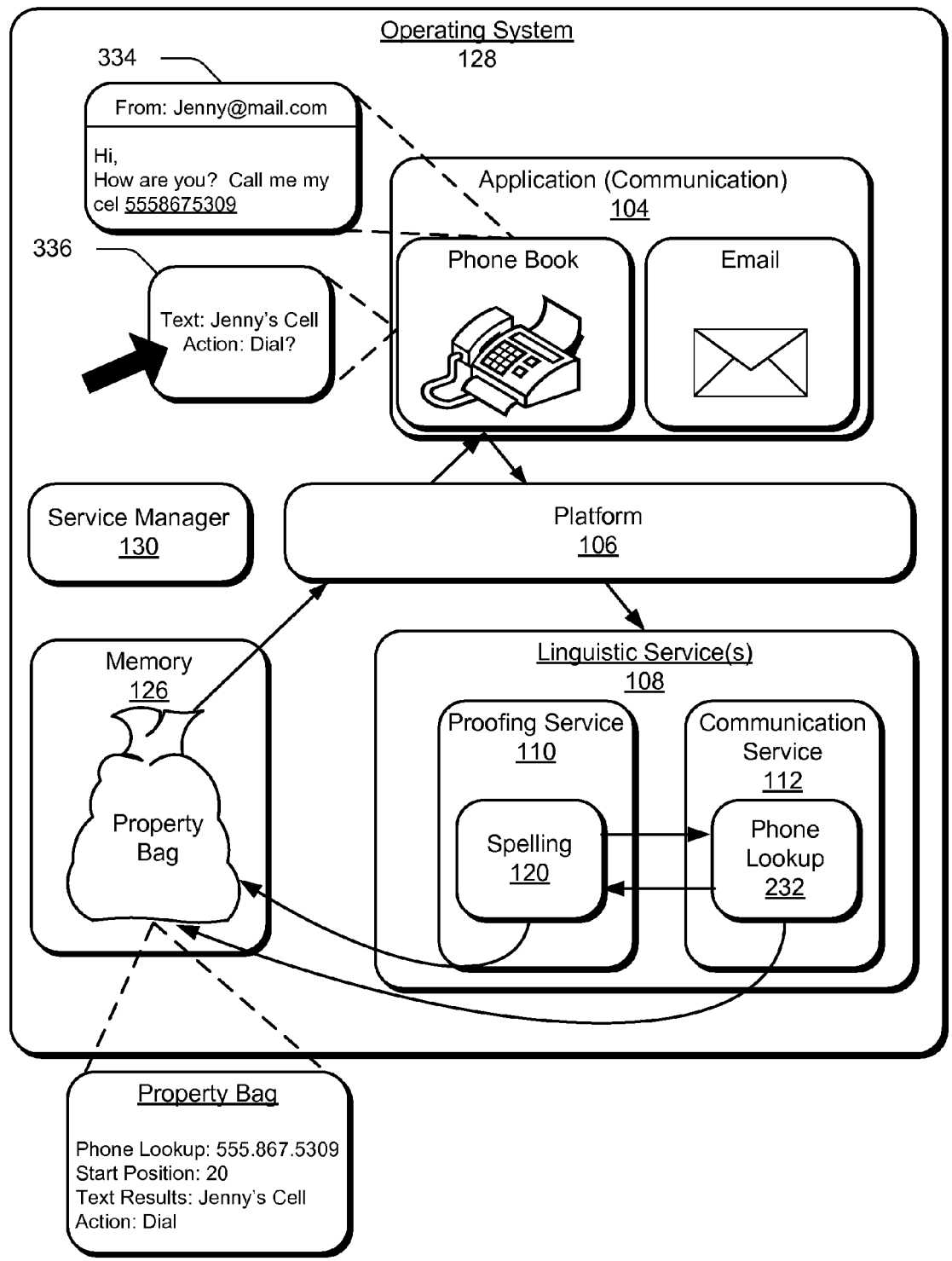
FIG. 3 is an illustration of an example implementation showing brokered communication that may be employed by a system of FIGS. 1 and 2.

Referring to FIG. 3, once the linguistic services are designated, the application 104 (in a system 300) may send a text 334 to a designated linguistic service for recognition. For example, the platform 106 may broker communication of the text 334 to the designated linguistic services. The platform 106, for example, may route or direct the text 334 to the proofing service 110.

The designated linguistic services may recognize linguistic property information associated with text data in the text 334. For example, one of the linguistic services 108 may associate linguistic property information with text data within range of the text 334, e.g., 8 bytes of data that start at a position 20 bytes into the text 334.

Consider for example, a session occurring between the application 104 (e.g., communication application) having the text 334, the proofing service 110 and the communication service 112. As illustrated, the text 334 may include a telephone number "5558675309" and the word "cel." The platform 106 may, for example, broker communication of the text 334 by directing the text 334 to the proofing service 110.

Upon receiving the text 334, the proofing service 110 may recognize linguistic property information associated with text data within a range of the text 334 and return linguistic property information to the application 104. For example, the proofing service 110 may recognize that the word "cel" is misspelled (e.g., "cel" is not in a dictionary) and that the word "cel" is an improper spelling of the word "cell." As a result, the proofing service 110 may populate the memory 126 (e.g., "property bag") with the linguistic property information indicating that the text data is misspelled and the text data is the word "cell." The proofing service 110 may associate the foregoing linguistic property information with a range occupied by the word "cel" in the email message. For example, the word "cel" may start at position 51 and go for three units in the text 334.

In the case of the communication service 112, upon receiving the text 334 (e.g., an email message), the communication service 112 may recognize that text data "5558675309" is a telephone number, e.g., the text data within the range occupied by "5558675309" corresponds to a telephone number. The range for the telephone number may, for example, start at position 55 in the text and have a length of 10 units. In response to recognizing the text data as a telephone number, a phone lookup module 232 may populate the memory 126 with caller identification information associated with the telephone number, e.g., "Jenny" and associate a range starting at position 55 with the term "Jenny".

With the linguistic property information in the memory 126, the platform 106 may communicate the text data property information. For example, the proofing service 110 may store the linguistic property information "cell" in memory 126 until the communication service 112 has recognized the telephone number—at which time, the word "cell" and the caller identification information, "Jenny," may be communicated to the application 104.

When the text data within the range has been altered (e.g., the text has been deleted or modified) since the associated linguistic property information was stored in memory 126, the platform 106 may release the memory 126 storing the linguistic property information. For example, the platform 106 may permit deletion or overwriting of a portion of the memory 126 storing the linguistic property information when the associated text data has been altered.

In one or more embodiments, the linguistic services 108 may be configured to interact with other linguistic services through the platform 106. For example, the language detection service 118 may be used to designate the text data as, for example, German before requesting that a German proofing service spell-check the text data. In the foregoing situation, the language detection service 116 may return the recognized linguistic property information (e.g., the text data is German) through the platform 106 to the German proofing service. In another example, the proofing service 110 may request that the language detection service 116 identify which human language is associated with the text data and return the linguistic property information result to the proofing service 110.

In some implementations, the linguistic services 108 may be configured to form a callback to the application 104 upon recognizing the linguistic property information. For example, the proofing service 110 may form and send the application 104 a callback that indicates that the memory 126 has been populated with linguistic property information. In response, the application 104 may instruct the platform 106 to communicate the linguistic property information.

In another implementation, the linguistic services 108 output the linguistic property information in a format indicated by the application 104. For example, as part of initiating a session, the application 104 may indicate that the proofing service 110 is to return the linguistic property information in hypertext markup language (HTML) format. In other implementations, the linguistic service 108 may return multiple versions of the linguistic property information, e.g., as Unicode text and HTML. In further embodiments, the linguistic services 108 may output linguistic property information in a format specific to one or more applications to accommodate interrelated applications.

In one or more embodiments, the linguistic services 108 may indicate that an action is associated with the text data within a range of the text. For example, the communication service 112 may indicate that text data "5558675309" is a telephone number and/or prompt the user via a user interface to initiate the communication service 112 to dial the telephone number 336. Having discussed techniques, approaches, interactions and functions associated with linguistic services and the platform 106, the map service 114 will be discussed in-depth.

Figure 4:
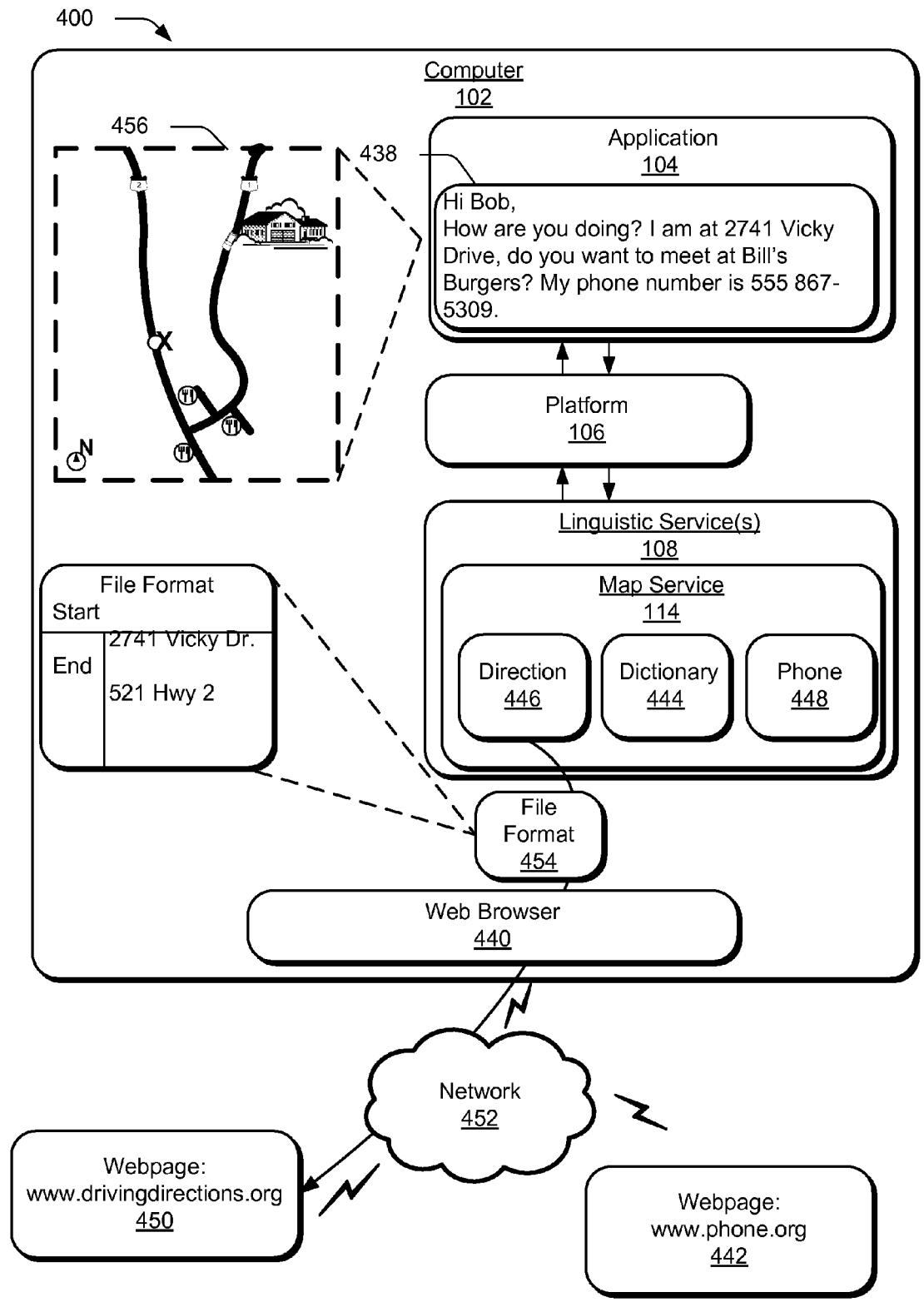
FIG. 4 is an illustration of an environment in an example implementation that is operable to access a webpage to pass content usable to perform an action that is recognized from the content that may be employed by a system of FIGS. 1-3.

Referring to FIG. 4, as illustrated an environment 400 includes the computer 102 with the map service 114. As described with respect to FIGS. 1-3, the map service 114 may be independent from the application 104 implementing the actions supported by the map service 114.

The map service 114 is representative of functionality to access a webpage to pass content that is usable to perform an action recognized from a text 438. For example, upon recognizing an action associated with content in the text 438, the map service 114 may invoke a web browser 440 that opens the webpage specified by the map service. For example, the map service may specify which of a plurality of webpages is to perform the action. Thus, the webpage may not be specified in the text by a URL pointing to the webpage.

The map service 114 may access the webpage to pass the content for use in performing the action. For example, when a telephone number can be dialed, the map service 114 may invoke the web browser 440 to pass a telephone number for use in dialing the telephone number. By configuring the map service 114 in this manner, additional webpage supported actions may be provided in a straight-forward manner as the map service 114 may interact with the webpage based on data rather than accounting for the webpage's design.

The map service 114 may recognize the action from the content by identifying features associated with the content. For example, the map service 114 may recognize that caller identification information may be obtained for the content "(555) 867-5309" by parsing the text characters "555", "867" and "5309" from the text 438, e.g., an email. The map service 114 may recognize the action (e.g., obtain caller ID information) because the content "(555) 867-5309" has features associated with obtaining caller ID information, e.g., 10 digits, the digits are arranged in two three-digit sets followed by a four digit set, the first three digits match an area code and so on. As a result, the map service 114 may access a phone webpage 442 to obtain caller ID information.

As illustrated, the map service 114 includes a dictionary subservice 444, a direction subservice 446, and a phone subservice 448. Subservices are representative of functionality to access a corresponding webpage and to pass content in a format usable by the webpage. For example, the direction subservice 446 may access the webpage "www.driving-directions.org" 450 and format the content for the "www.driving-directions.org" webpage 450.

As illustrated, the webpage "www.driving-directions.org" 450 is available via a network 452, such as the Internet. For example, the webpage "www.driving-directions.org" 450 may be communicatively coupled via wired or a wireless network to the computer 102.

In some implementations, the map service 114 recognizes actions that are supported by included subservices. For example, when the map service 114 includes a phone subservice 448 that corresponds to the phone webpage 442, the map service 114 may recognize actions associated with the phone webpage 442, such as dial, call waiting and so on.

When the webpage/subservices are configured as plugins to the map service 114, the webpage may inform the map service 114 as to which actions the corresponding webpages support. For example, the phone subservice 448/phone webpage 442 may inform the map service 114 that caller ID information may be obtained and call dialing is available.

The map service 114 may use the subservices to format the content to correspond to a format used by the webpage. For example, when accessing the webpage "www.driving-directions.org" 450, the map service 114 may implement the direction subservice 446 to format the content into a form that is usable by the "www.driving-directions.org" webpage 450. In an example of the foregoing, the map service 114 may parse a starting physical address and an ending physical address from the content "I am at 2741 Vicky Drive, do you want to meet at Bill's Burgers?" for inclusion in a set of parameters passed to the "www.driving-directions.org" webpage 450.

While the map service 114 may recognize the action by examining the text (e.g., a string), the map service 114 may be configured to pass a set of parameters parsed from the text to cause the webpage to perform the action. Thus, in the driving direction example, while map service 114 may recognize the action (obtain driving directions) from the phrase "Do you want to meet at . . . " the parameter "2741 Vicky Drive" may be included in the set of parameters.

In examples in which a parameter is missing or not provided, the map service 114 may request that the application provide additional text so that the webpage may perform the action. For example, when text is associated with obtaining driving directions (e.g., a starting physical address of 2741 Vicky Drive and an ending physical address of "Bill's Burgers") the map service 114 may callback to the application 104 for the ending physical address. In response, the application may provide the physical address for Bill's Burgers (e.g., 521 Highway 2) that is included in the set of parameters.

When the application does not have a parameter, the map service 114 may form a communication to cause the application 104 to present a user prompt. For example, the map service 114 may send the application 104 a callback that informs the application of the missing content. In response, when the application 104 does not have the parameter, the application may present a popup window that asks a user if he/she wants driving directions and to provide the end physical address.

In other instances, in which a parameter is missing, the map service 114 may be configured to use a search engine in the web browser 440 to obtain the parameter, e.g., a physical address for Bill's Burgers.

In one or more embodiments, the map service 114 populates a file format 454 that includes one or name entities that are filled in with the parameters from the text content. In one or more embodiments, the name entity may be a tokenized information unit that may be filled in with a parameter that is used to perform the action. For example, a file format 454 for the "www.driving-directions.org" webpage 450 may include a name entity for a starting physical address and a name entity for an end physical address. The name entity "starting physical location" may be a tokenized information unit that when filled in with a physical address is used to perform the action, e.g., to generate driving directions. In this way, the map service 114 may populate the name entities with the content from the text 438 and pass the content as a set of parameters that may be used to perform the action. Although the file format 454 and name entities may be specific to a particular webpage, since a data driven approach is employed, webpages may be added and changed without writing code for the webpage.

In one or more embodiments, subservices may be added or changed as part of configuring the map service 114. For example, the service manager 130 may be used to pick which subservices/webpages the map service 114 can use. Thus, when a physical address is recognized, the map service 114 may access the webpage "www.driving-directions.org" 450 to provide driving direction rather than using another driving direction webpage. As a result, instead of accessing a webpage corresponding to the URL address, the map service 114 may specify which webpage of a plurality of webpages is to be accessed from the content itself. By configuring the map service 114 to specify which webpage is to be accessed, errors resulting from missing or changed addresses may be avoided and the text may not include a URL corresponding to the webpage being accessed.

Figure 5:
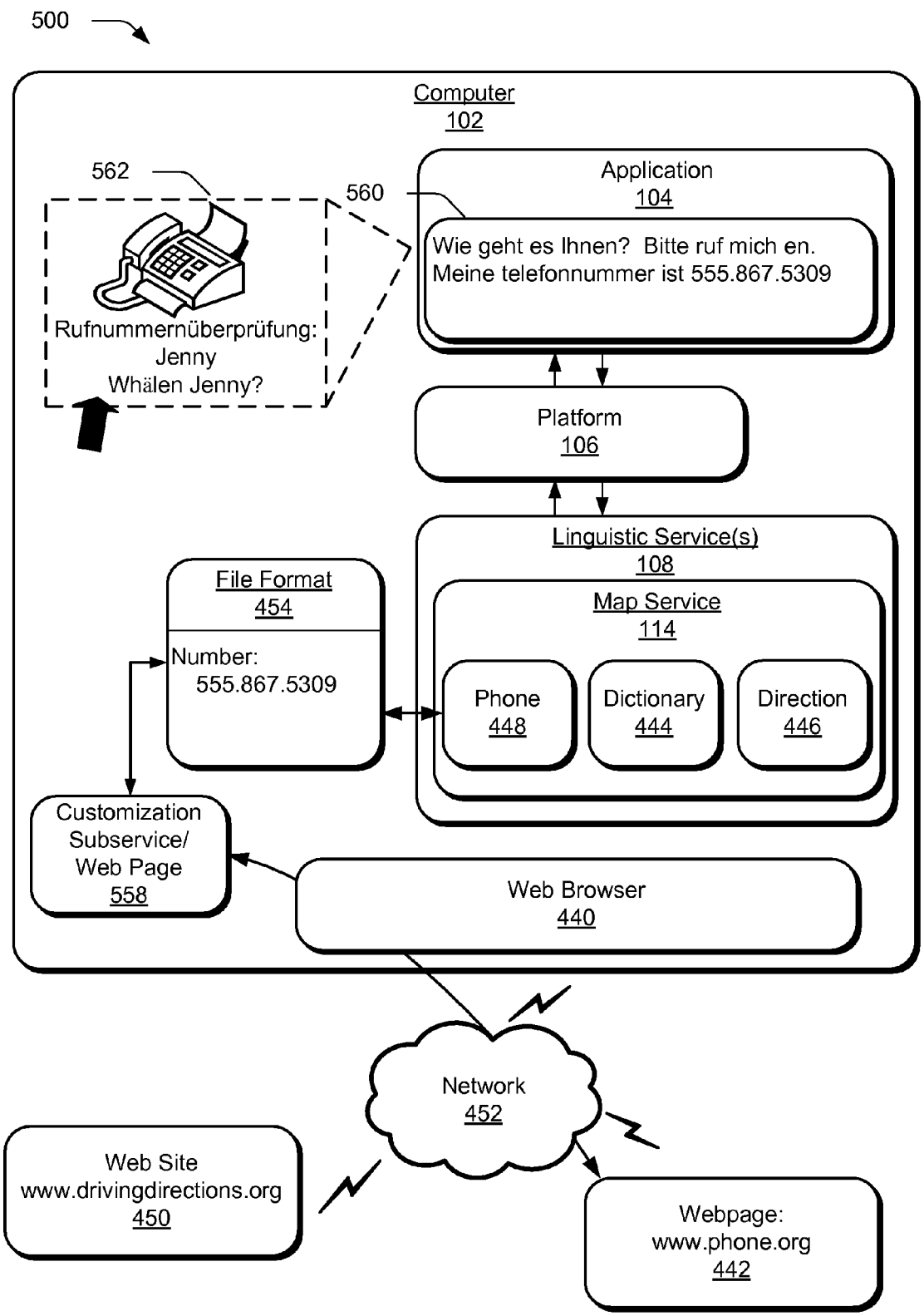
FIG. 5 is an illustration of an environment in an example implementation that is operable to access a webpage to pass content usable to perform an action that is recognized from the content that may be employed by a system of FIGS. 1-3.

Referring now to FIG. 5, as illustrated an environment 500 includes a computer 102 having a customization webpage 558. The customization webpage 558 may be configured and operate as a subservice/webpage discussed with respect to FIG. 4. As illustrated, the customization webpage 558 is included in the computer 102. In other implementations, customization webpage 558 may be communicatively coupled to the computer via the network 452, e.g., the Internet or a private network.

The customization webpage 558 is representative of functionality to customize content, actions, and/or results for interactions between the map service 114 and one or more webpages in accordance with one or more criteria. For example, the customization webpage 558 may be used to specify one or more characteristics of a result of the action. For example, the application may specify which criteria are to be applied by the customization web page to customize the action and/or results from the action. For example, the customization webpage may specify that the text is to be in German in response to receiving a German criteria from the application 104. Thus, if the phone webpage 442 uses the English language, but the application 104 is using a German language interface, the map service 114 may access the customization webpage 558 to customize content and/or the results of the action into the German language. As a result, interactions with the map service 114 and/or text resulting from the action may be provided in German.

In one or more embodiments, the criteria specified by the application may be included in the set of parameters. For example, the application may specify that text data is to be provided in German when sending the text to the map service 114.

For example, when the map service 114 recognizes the action "dial" from a telephone number in a word processing document 560, instead of inserting the text identifier "dial," the customization webpage 558 may be accessed to translate the English word "dial" into the German version, "whälen." Continuing the previous example, when the action includes the phone webpage 442 providing caller ID information, the customization webpage 558 may be accessed to translate the content and/or the action's results (e.g., caller ID information) into German.

Moreover, by configuring the map service 114 and/or the customization webpage 558 in this manner, the application 104 may avoid repeating text in multiple languages. Instead of inserting, for example, the text identifier "dial, whälen, marcar, quadrante," the map service 114 may form a communication that is used insert the text identifier "whälen" (the German word for dial) in the prompt 562 used to trigger the dial action. The communication, for example, may be a callback to the application to inform the application to provide the prompt 562.

In one or more embodiments, the application 104 may designate a one or more criteria used to customize the content and/or the results of the action. For example, the application 104 may issue an application program interface (API) call that designates that the content and/or text results are to be provided in the German language.

In one or more embodiments, the webpage that is to perform the action may provide a reference that corresponds to the action. For example, when the action to be performed is to provide an object (e.g., a national flag) instead of providing the object the webpage that is originally to perform the action (e.g., provide the national flag) may provide a reference for the object, e.g., object #12. In addition, the webpage may indicate which resource is available to perform the action (e.g., provide the object). An example of the foregoing is an encyclopedic webpage indicating that object #12 is available at www.flagsofthenations.org. In other instances, the map service and/or the customization webpage may designate which webpage is to perform the action, e.g., provide object #12. In response to receiving the reference, the map service may be configured to access the resource (e.g., www.flagsofthenations.org) that performs the action in a customized manner. Thus, if object #12 references a flag and the criterion "Japanese" is provided, the indicated webpage (e.g., www.flagsofthenations.org) may provide the Japanese flag. In contrast, if the criterion "Thai" was provided the webpage www.flagsofthenations.org may provide the flag of Thailand.

In some implementations, as part of accessing another webpage (e.g., a web page that performs an action), the map service 114 may access the customization webpage 558 to cause the customization web page to notify the webpage performing the action how to provide the results of the action and so on. When accessing a dictionary webpage, for instance, the map service 114 may have the customization webpage notify the dictionary webpage which human language is to be used for text result of the action.

While translating has been discussed, the customization webpage 558 may be used to modify one or more characteristics of a result of the action, e.g., settings, configurations and so on. The map service 114, for example, may use the customization webpage 558 to indicate how the action is to be performed, when the action is to be performed, how to provide results of the action and so on.

The components, service, modules, functions and techniques discussed above may be implemented singly or in combination based on design preference. Generally, any of the modules, services and functions described herein can be implemented using software, firmware, hardware (e.g., fixed logic circuitry), manual processing or a combination of these implementations. The terms "module," "functionality," and "logic" as used herein generally represent software, firmware, hardware or a combination thereof. Additionally, functions can be embodied as executable instructions that are included in one or more computer-readable storage media.

Example Procedures

The following discussion describes transformation procedures that may be implemented utilizing the previously described structures, modules, approaches and techniques. Aspects of the procedures may be implemented in hardware, firmware, software or a combination thereof. The procedures are shown as a set of blocks that specify operations performed by one or more devices and are not necessarily limited to the orders shown for performing the operations by the respective blocks. In portions of the following discussion, reference will be made to the environment 100 computer 102 discussed with respect to FIGS. 1-5.

Figure 6:
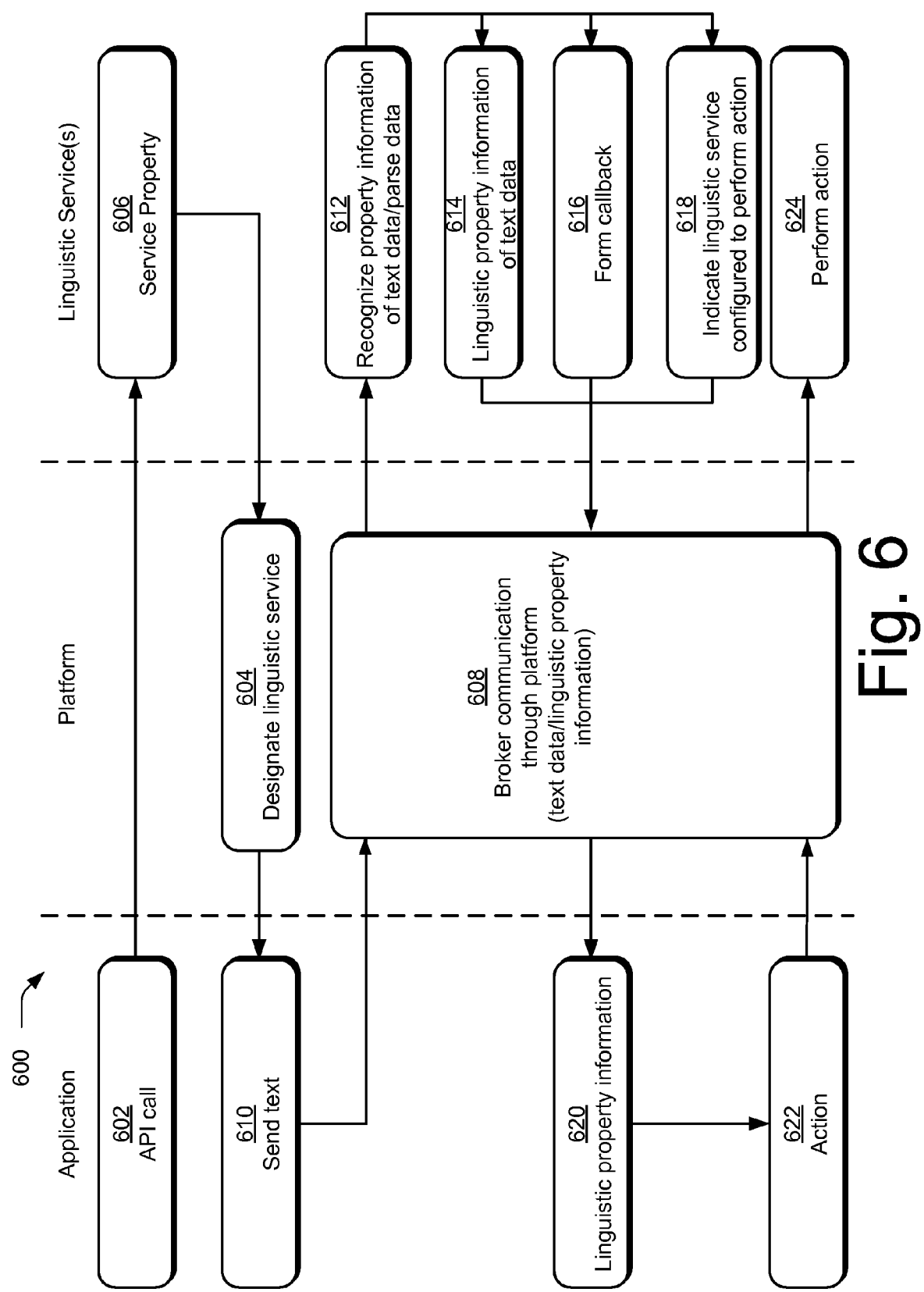
FIG. 6 is a flow diagram depicting a procedure in an example implementation in which an application and a linguistic service communicate through a platform.

FIG. 6 depicts a procedure 600 in an example implementation in which an application and one or more linguistic services communicate through a platform. For example, the procedure may be performed by the computer 102 including the application 104 and the platform 106 discussed with regard to FIGS. 1-4.

An API call requesting one or more linguistic services, based on a property of the linguistic services, is issued (block 602). In one or more embodiments, the API call specifies which service properties the application 104 wants to use. In other instances, the API call may be a general request to interact with the linguistic services available through the platform 106.

Responsive to the API call, the linguistic services that are available are designated (block 604). For example, the platform 106 may designate the linguistic services 108 that have a service property specified in the API call (e.g., a spelling property) are available to recognize linguistic property information associated with text data. The designation of the linguistic service 108 based on one or more service properties may obscure the linguistic services 108 from the application 104 (and vice versa). In the foregoing manner, the application 104 may not be specifically configured for the linguistic service 108. For example, instead of designating the proofing service 110, the platform 106 may designate the proofing service 110 based on a spelling property and a grammar property. In addition, this approach may minimize the number of different APIs used by the application in comparison to issuing API calls for a linguistic service.

In some embodiments, the platform may obtain the property of the linguistic service from the linguistic service in response to receiving the API call (block 606). In other embodiments, the platform 106 may have the property of the linguistic service 108 as the linguistic service may be a plugin to the platform 106.

In one or more embodiments, the API call may indicate that the linguistic service 108 is to output linguistic property information in a particular format. For example, the application 104 may request that linguistic property information is to be output in HTML format.

Once a session is initiated, the text including text data may be communicated through the platform (block 608). For example, the platform may broker communication of text (e.g., the email message) (block 610) passing through the platform. The platform 106 may, for example, direct communications between the application 104 and/or linguistic services 108. In some embodiments, the platform 106 may broker communications between linguistic services performing functions for the application 104. For example, the grammar service 122 and the language detection service 116 may communicate through the platform 106.

Linguistic property information associated with text data in a text is recognized (block 612). For example, the communication service 112 may recognize linguistic property information associated with text data within a range of text communicated from the application 104 through the platform 106.

Upon recognizing linguistic property information associated with text data, the linguistic property information may be communicated to the application (block 614). For example, the linguistic service 108 may populate the memory 126 with the linguistic property information associated with text data. The text data information may be stored in the memory 126 until the platform communicates (block 608) the linguistic property information to the application.

In one or more embodiments, a callback may be formed (block 616) for communication to the application (block 608). For example, when the application 104 is configured for a-synchronic communication, the linguistic service 108 may form the callback to inform the application 104 that recognition is complete.

In some embodiments, when an action is associated with the text data, the recognized linguistic property information may include an indication (e.g., an actionID) that the linguistic service may perform the action (block 618). For example, if an email address is recognized in a word processing document the communication service 112 may indicate that the linguistic service 108 can send an email message to the email address.

With the linguistic property information (block 620), the application may initiate the action (block 622) for performance by the service (block 624). In the previous word processing document example, the application may display a user interface that permits initiation of the action, e.g. create an email message targeting the email address.

Figure 7:
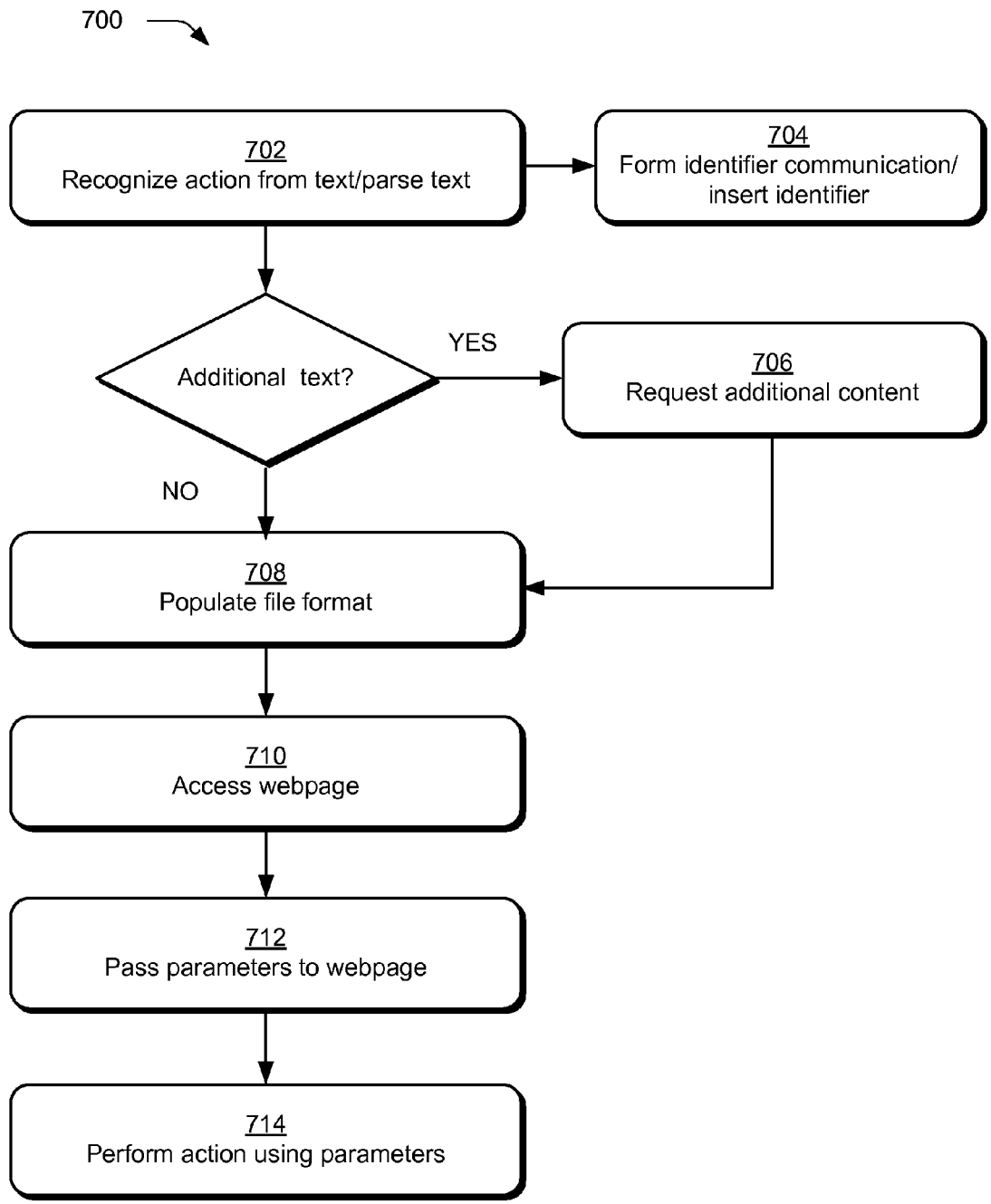
FIG. 7 is a flow diagram depicting a procedure in an example implementation in which script detection is employed.

FIG. 7 depicts a procedure 700 in an example implementation in which a webpage is accessed to pass content that usable to perform an action recognized from the text. For example, when the word "bear" is in a word processing document, the action may be to obtain additional information about bears from an encyclopedic webpage.

A recognition is performed to identify an action that can be performed from content in a text (block 702). Thus, when a telephone number is parsed from an email, the recognized actions may include dialing the telephone number and/or providing caller ID information using the telephone number. In the previous example, a webpage (configured to perform phone functions) may be capable of using the telephone number to obtain the caller ID information and/or to dial the telephone number.

In some implementations, a communication may be formed that is usable to inject an identifier in the text to trigger the action (block 704). For example, upon recognizing that a telephone number can be dialed, the text identifier "Dial?" may be inserted into visual display of the text. Thus, the telephone number may be dialed by clicking on the text identifier "Dial?" in a visual representation of the text. In some implementations, this communication is a callback to the application providing the text.

When content that is to be used to perform the action is missing or not supplied, a request for additional content may be made (block 706). For example, when driving directions are to be provided, but an end physical address is not in the content, a request may be made to provide the missing data, e.g., the end physical address. In some implementations, a callback to the application is used to request additional content in order to perform the action.

The content may be used to populate a file format (block 708). A file format may include one or more name entities that are filled-in with content that corresponds to the name entity. For example, when a file name entity is included in the file format, the file name entity may be filled with the name of the file providing the text, e.g., "report." In this way, the content may be passed as a set of parameters that can be used to perform the action.

A webpage may be accessed to pass the content that is to be used to perform the action (block 710). For example, a web browser may be invoked to open the webpage that is to perform the action. By applying a data type approach (e.g., passing content in the file format), webpage specific issues and issues associated with using a URL may be avoided. In addition, by implementing a data driven approach, an application can add or change actions without changing the application.

With the webpage accessed, the map service may pass the content to the webpage (block 712). For example, the file format, that includes the content, is passed via the web browser 440 to the webpage. The action may be performed by the webpage (block 714) and results of the action are provided for use by the application. For example, when the action is to perform a mortgage calculation, the result of the mortgage calculation may be communicated (such as via the map service 114 and the platform 106) to the application 104 that presents a monthly payment.

Figure 8:
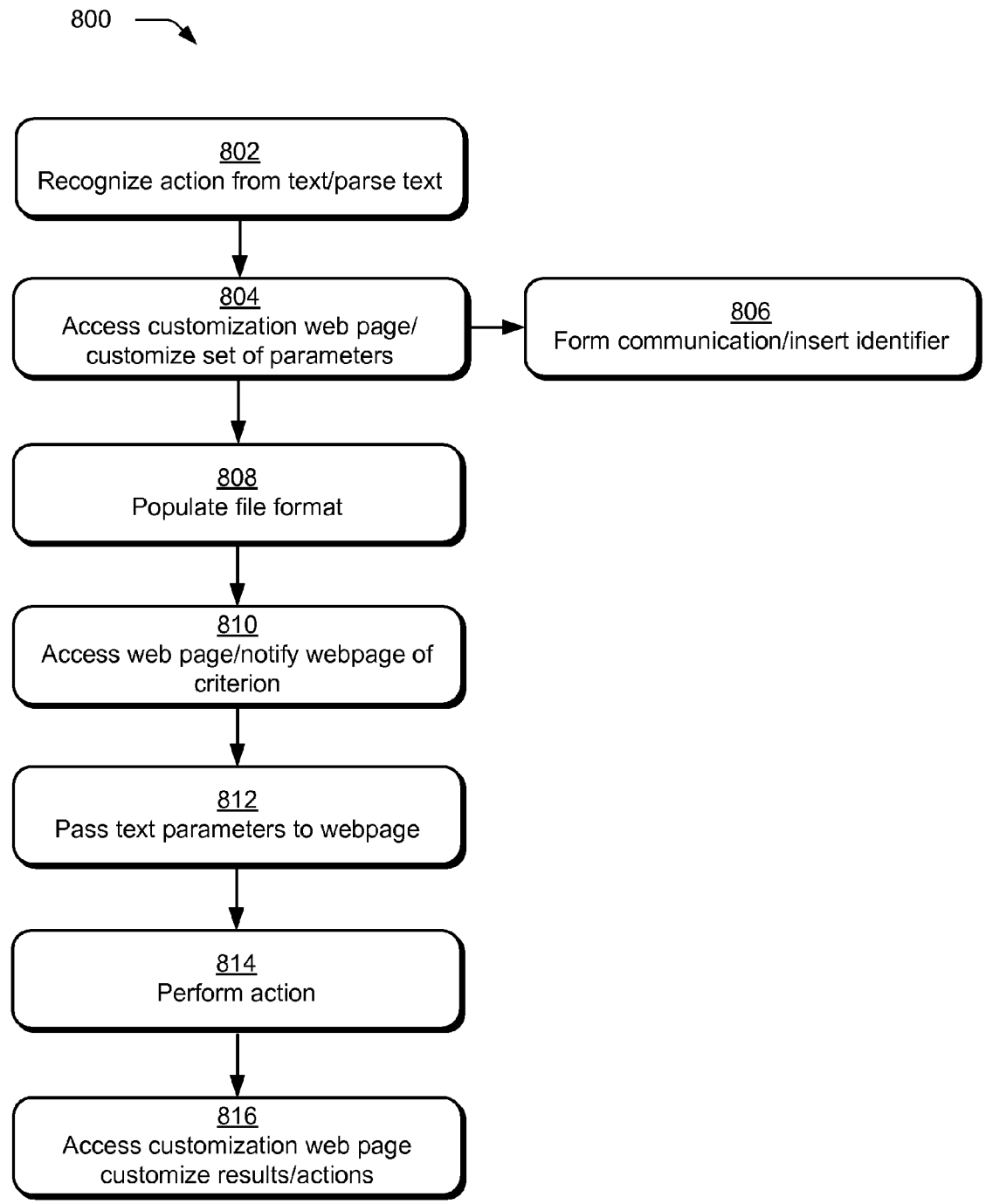
FIG. 8 is a flow diagram depicting a procedure in an example implementation in which language detection is employed.

FIG. 8 depicts a procedure 800 in an example implementation in which customized interactions with a webpage are employed. For example, the procedure may be used to customize content, actions, results of actions and the like. As will be appreciated, the customization procedure 800 may be used in conjunction with the procedures discussed with respect to FIGS. 6 and 7.

A recognition is preformed to identify an action from content that is usable to perform the action (block 802). For example, a dial action is recognized for a telephone number parsed from an email message.

When customization of the content is to be employed, a customization webpage may be accessed and the content may be customized according to one or more criteria specified for the action (block 804). For example, a customization webpage may include a criterion that specifies that, upon recognition that a telephone number can be dialed, a telephone icon and the word "whälen" are to be provided in a visual display of the text. In some instances, the criteria are specified by the application. For example, the criteria may be included with the set of parameters and so on. Thus, the content and/or actions may be customized as specified by the application and/or in accordance with a user's personal preferences.

In some implementations, the application providing the text may designate a criterion that is to be applied. For example, when an application is using a German language interface, the application may designate that the content and/or the results of the actions are to be provided in German. In some instances, the application may provide the criteria with text.

When a customized identifier of the action is to be provided, a communication may be formed that is usable to insert the customized identifier in the text (block 806). For example, a callback to the application 104 may be used to so that the application 104 presents a popup with a telephone icon and the word "whälen."

The customized content may be used to populate a file format (block 808). For example, the file format may include one or more name entities that are filled-in with the customized content that corresponds to the name entity. In other instances, the text content may be passed without customization.

A webpage that is to perform the action may be accessed (block 810) and the customized content may be passed to the webpage (block 812).

In some implementations, a notification may be provided to inform the webpage that is to perform the action of one or more of the criterion. For example, the customization webpage may notify the webpage that is to perform the action that included text is to be provided in German.

The action may be performed by the webpage (block 814) and a customization may be performed for the action and/or the results of the action (block 816). For example, as part of providing the results of the action, the customization web page may be accessed and the text result of the action may be translated into German in accordance with a criterion as specified by the application. In some instances, the customization may be dynamically performed as data becomes available from the web page performing the action. For example, the customization web page may translate the text in accordance with the criteria specified by the application as the text becomes available from the web page performing the action.

While translation has been discussed with respect to customizing it is to be appreciated that customization may include, but is not limited to, designating a font size, designating a display size, designating a layout, customizing settings, configurations and so on.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented by one or more computing devices, the method comprising:
enumerating, by a platform, a plurality of linguistic services that are available for use by an application based on a service property of respective said linguistic services;
receiving text by the platform from the application for processing by a particular said linguistic service;
in response to receiving data by the platform from the application via an API call, designating which of the plurality of linguistic services is to be available for use by the application based on the service properties of the respective said linguistic services that are relevant to the application; and
forming a communication by the platform to communicate the text to the particular said linguistic service.

2. A method as described in claim 1, further comprising designating the specified linguistic services by the platform.

3. A method as described in claim 2, wherein the designating is performed such that at least one said linguistic service having a service property that is not specified by the application in the data via the API call is not designated by the platform.

4. A method as described in claim 1, wherein the particular said linguistic service is configured to recognize linguistic property information associated with the text.

5. A method as described in claim 4, wherein the platform receives linguistic property information from the particular said linguistic service and forms a communication that includes the linguistic property information for communication to the application.

6. A method as described in claim 4, wherein the particular said linguistic service is configured to output the linguistic property information in a format as indicated by the application.

7. A method as described in claim 1, wherein the particular said linguistic service is configured to indicate an action that is associated with the text.

8. A method as described in claim 7, wherein the action is performable by the application.

9. A method as described in claim 1, wherein the particular said linguistic service is configured to interact with another said linguistic service without interacting through the platform.

10. A method implemented by one or more computing devices, the method comprising:
enumerating, by a platform, a plurality of linguistic services that are available for use by an application based on a service property of respective said linguistic services;
receiving text by the platform from the application for processing by a particular said linguistic service; and
forming a communication by the platform to communicate the text to the particular said linguistic service, the particular said linguistic service configured to form a callback to the application upon recognition of linguistic property information associated with the text.

11. A method as described in claim 10, wherein the callback causes the application to request the linguistic property information from the platform.

12. A system implemented by one or more computing devices, the system including:
an application that is executable on the one or more computing devices; and
a platform that is executable on the one or more computing devices to enumerate a plurality of linguistic services that are available for use by the application based on a service property of respective said linguistic services and act as an intermediary to manage communication between the application and the plurality of linguistic services, the platform configured to designate linguistic services specified by the application such that at least one said linguistic service having a service property that is not specified by the application in an API call received by the platform from the application is not designated by the platform.

13. A system as described in claim 12, wherein the platform is configured to:
   receive text from the application for processing by a particular said linguistic service having the service property that is not specified by the application in the API call received by the platform from the application; and
   form a communication to communicate the text to the particular said linguistic service.

14. A system as described in claim 13, wherein the particular said linguistic service is configured to recognize linguistic property information associated with the text.

15. A system as described in claim 14, wherein the platform receives linguistic property information from the particular said linguistic service and forms a communication that includes the linguistic property information for communication to the application.

16. A system as described in claim 14, wherein the particular said linguistic service is configured to output the linguistic property information in a format as indicated by the application.

17. A system as described in claim 15, wherein the particular said linguistic service is configured to form a callback to the application upon recognition of the linguistic property information that causes the application to request the linguistic property information from the platform.

* * * * *